June 4, 1935.  G. F. McDOUGALL  2,004,078

HYDRAULIC BRAKE MECHANISM

Filed July 1, 1933  2 Sheets-Sheet 1

INVENTOR
*GEORGE F. McDOUGALL*
BY *Williams, Bradbury, McCaleb & Hinkle*
ATTORNEYS June 4, 1935.　　　　G. F. McDOUGALL　　　　2,004,078
HYDRAULIC BRAKE MECHANISM
Filed July 1, 1933　　　　2 Sheets-Sheet 2
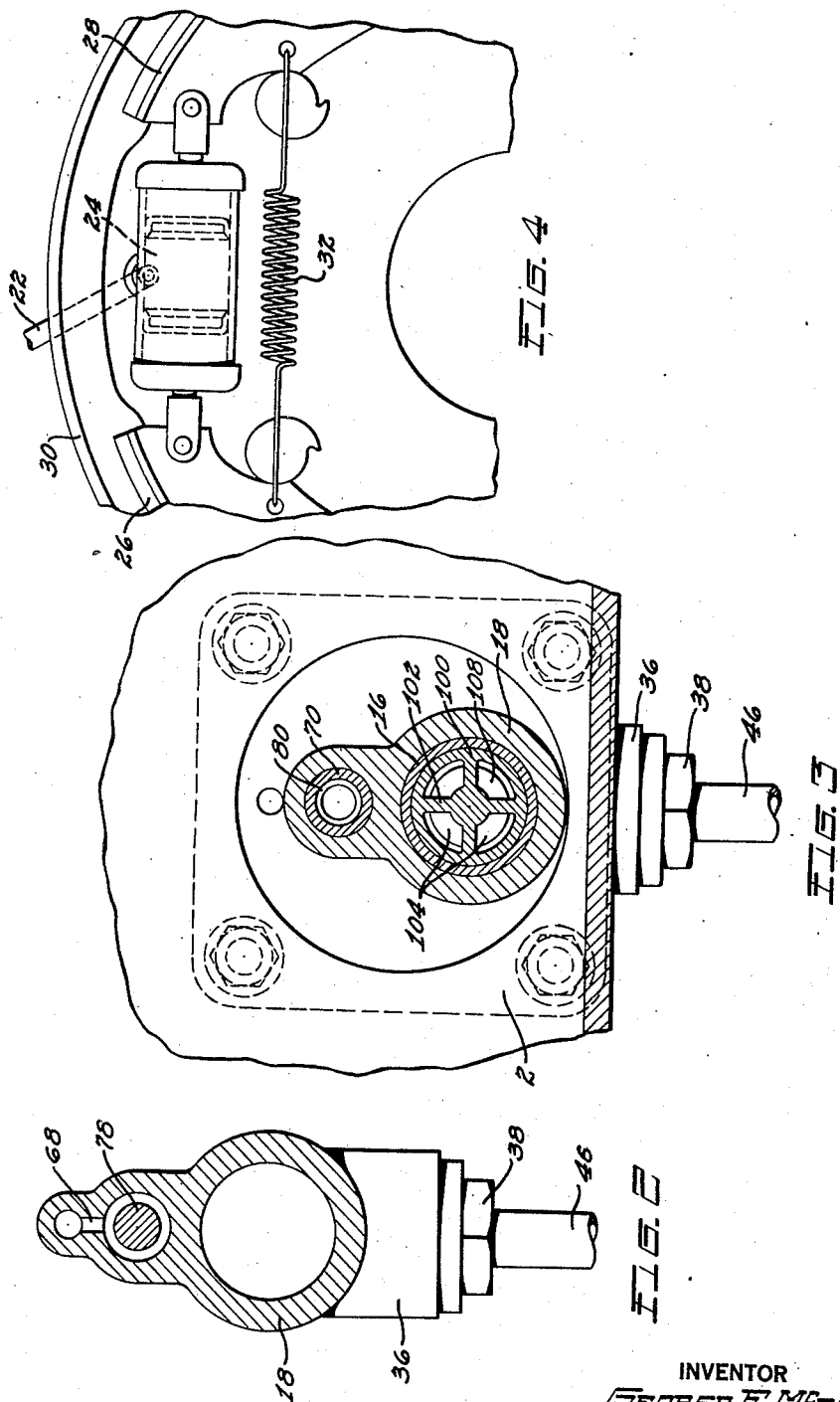

Patented June 4, 1935

2,004,078

UNITED STATES PATENT OFFICE 2,004,078

HYDRAULIC BRAKE MECHANISM

George F. McDougall, Portland, Oreg., assignor to Hydraulic Brake Company, Detroit, Mich., a corporation of California Application July 1, 1933, Serial No. 678,627

10 Claims. (Cl. 60—52)

This invention relates to hydraulic brakes, and more particularly, to hydraulic brakes for motor vehicles.

The invention comprehends a hydraulic brake for large, heavy vehicles, such as stages and trucks, the brake being operatable through a foot pedal lever, the applying force of which may be supplemented by power from the prime mover of the vehicle to effectively spread the friction elements of the brake into engagement with a rotatable drum to effectively retard rotation of the drum.

An object of the invention is to provide a hydraulic brake for a motor vehicle, the operation of which may be supplemented by power from the prime mover of the vehicle, and to so construct the brake that the operator may feel the brake application as it increases in intensity in much the way as an operator appreciates the intensity with which the conventional hydraulic brake is applied when operated solely by the operator's own effort against the resistance encountered. That is to say, that the power required to apply the brake must require an increase in the amount of effort precisely as does an ordinary brake operatable through a foot pedal lever, though, of course, in less degree, and thus prevent accidents that may result were an operator able to apply the maximum amount of power to the brakes of a vehicle by some means, such as a moving lever, the resistance to movement thereof not indicating the severity of the brake application.

Another object of the invention is to provide means for applying the brakes of a motor vehicle operatable so as to render it quite impossible to lock the wheels of the vehicle upon brake application by carelessly applying too great a braking force without being given a warning by feeling the force as it is applied.

Another object of the invention is to provide a hydraulic brake mechanism for a motor vehicle including an actuating means operable manually, and an auxiliary actuating means operable from the prime mover of the vehicle, the brake mechanism being operatable effectively and efficiently manually when the auxiliary actuating means is not available, as, for example, when the prime mover is idle.

A further object of the invention is to provide a hydraulic brake system wherein a positive pressure may be maintained within the system at some predetermined point above atmospheric to prevent the entrance of air into the system so that the system may be rendered fully effective in operation at all times.

Yet a further object of the invention is to increase the speed of the application of the brakes of a motor vehicle considerably above the speed it is possible to attain with manually operated brakes.

Other objects and advantages of the invention will more fully appear from the following description taken in connection with the accompanying drawings forming a part of this specification, and in which,—

Figure 2 is a transverse sectional view, substantially on line 2—2, Figure 1;

Figure 3 is a transverse sectional view, substantially on line 3—3, Figure 1;

Figure 4 is a side elevation, partly broken away, of a well-known brake structure including a motor cylinder, friction elements operated thereby, and a rotatable drum for cooperation with the friction elements.

Figure 1:
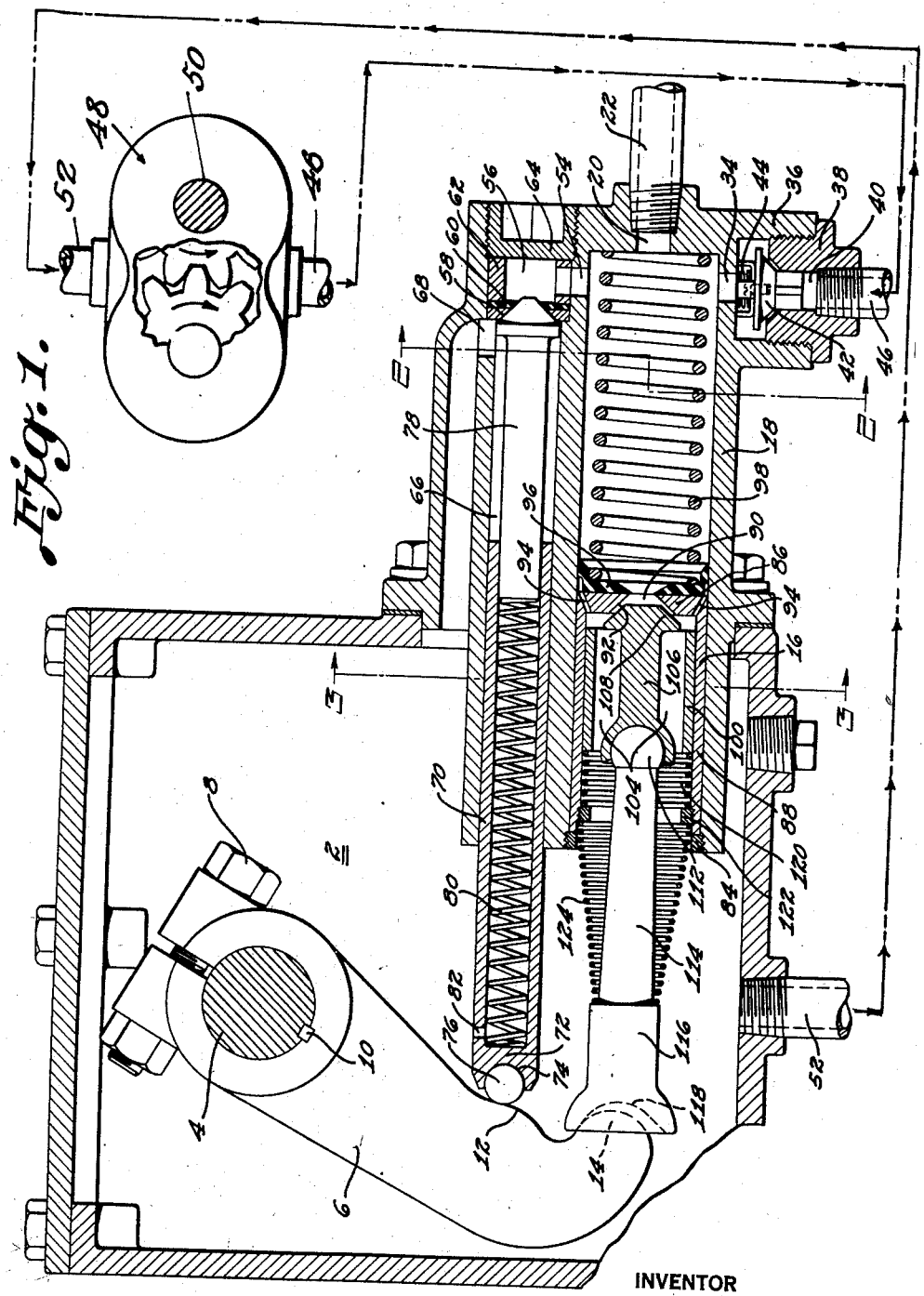
Figure 1 is a somewhat diagrammatic view of the pressure producing mechanism, the master cylinder assembly being shown in longitudinal section and the power-operated pump being shown with a part of the casing cut away to illustrate the gearing.

In the illustrated embodiment of the invention 2 indicates a reservoir which under initial conditions stands partially full of liquid. An operating shaft 4, journaled in the side walls of the reservoir, has one end extending outwardly from the reservoir for the reception of a foot pedal lever, not shown. The operating shaft 4 has secured thereon within the reservoir a lever 6 clamped in position by a bolt 8 and secured against relative movement by a key 10. The lever 6 is provided with a lobe 12, the object of which will hereinafter appear, and a rounded end portion 14 serving to transmit the rotary motion of the shaft 4 to a piston 16 movable within a cylinder 18.

The cylinder 18 is suitably mounted on the wall of the reservoir with its open end extending into the reservoir adjacent the bottom thereof. The head of the cylinder has an axial port 20 connected as by a pipe line or conduit 22 to a brake structure including a motor cylinder 24 having opposed pistons therein connected respectively to the separable ends of friction elements 26 and 28 arranged on a fixed support for cooperation with a rotatable drum 30, and the friction elements are connected by a spring 32 which servies to return these elements to retracted position and to retain them in the retracted position against suitable stops.

The cylinder 18 has a port 34 adjacent the head of the cylinder. This port communicates with an external sleeve 36 in which is threaded a nut 38 having a passage 40 controlled by a valve 42 normally held against its seat by a spring 44. The passage 40 communicates with a pipe line or conduit 46 connected to the outlet of a suitable pump 48, the driving shaft 50 of which may be driven from the prime mover of a motor vehicle, and the inlet of the pump is connected to a pipe line or conduit 52 communicating with a suitable opening in the bottom of the reservoir 2.

The cylinder 18 also has a port 54 adjacent the head of the cylinder. This port communicates with a chamber 56 having in one end thereof a valve seat 58 flanked by a rubber gasket 60, the valve seat and gasket being held in position by a ring 62 fitting snugly in the chamber and secured against displacement as by a plug 64 threaded in the open end of the chamber. The chamber 56 communicates with a passage 66 having an open end extending into the reservoir and provided with a port 68 adjacent the valve seat 58 which communicates with the reservoir. The passage 66 has therein a sleeve 70 having a closed end 72 provided with a recess 74 in which is positioned a ball bearing 76 adapted to engage the lobe 12 on the actuating lever 6. The sleeve 70 has therein a reciprocable valve 78 and a spring 80 for urging the valve against the seat 58. The sleeve 70 is provided with a port 82 communicating with the reservoir to provide free egress and ingress of liquid within the sleeve to avoid hydraulic resistance and to insure smooth operation of the valve.

The piston 16 is retained in the cylinder 18 by a ring 84 threaded in the open end of the cylinder. The piston includes a head 86 and a cylindrical skirt portion 88. The head has an axial opening 90 providing a valve seat 92 and a plurality of spaced passages 94, and positioned on the head is a leak-proof cup 96 held against displacement by a coil spring 98 interposed between the cup and the head of the cylinder. This spring also serves to return the piston to its normal position upon release of pressure in the cylinder.

A cylindrical section 100 reciprocable in the skirt 88 of the piston has an internal spider 102 providing a plurality of passages 104. The spider is integral with and supports the stem 106 of a valve 108 adaptable for cooperation with the valve seat 92, and the valve stem has a socket in which is seated a ball 112 formed on one end of a rod 114 having on its other end an enlarged portion 116 provided with a recess 118 for the reception of the rounded end portion 14 of the actuating lever 6.

A coil spring 120 is interposed between the cylindrical section 100 and a stop ring 122 threaded in the skirt of the piston. This spring serves to urge the cylindrical section toward the head of the piston, and since the cylindrical section 100 carries the valve 108 the valve is urged toward its seat 92 to close the port 90. Seated on the stop ring 122 is a conical spring 124 wound around the rod 114 and engaging the enlarged portion 116 of the rod so as to support the rod for engagement with the rounded end portion 14 of the actuating lever 6.

In operation, upon depressing a foot pedal lever, not shown, the operating shaft 4 is given a slight rotation to move the actuating lever 6 through an angle resulting in applying force through the connecting rod 114 to move the valve 108 to its seat 92 to close the port 90 in the head of the cylinder and seal off the liquid contained within the cylinder.

Assuming that the prime mover is in operation, and that the pump 48 driven thereby is delivering fluid from the reservoir 2 to the cylinder 18 with the valve 108 closed, pressure will be built up in the cylinder 18, the conduit 22, and the motor cylinder 24, resulting in spreading the friction elements 26 and 28 into engagement with the drum 30 to effectively retard rotation thereof. The intensity with which the friction elements 26 and 28 are engaged with the drum is dependent upon the load on the spring-pressed valve 78. The initial load on this valve requires substantial pressure to open it, approximately one hundred pounds per square inch in devices of this character used on small vehicles, and two hundred pounds or more per square inch on larger vehicles, it being understood that the motor cylinder 24 generally requires about forty to fifty pounds per square inch pressure to overcome the return spring 32 connected between the friction elements 26 and 28.

Upon closing the valve 108 a small additional compression is imposed on the spring 80, and upon further inward movement of the piston 16 in the cylinder 18 the spring 80 is compressed to increase the load on the valve 78 so that a greater degree of intensity of brake application follows directly in proportion to the movement of the brake pedal as in the case of the conventional hydraulic brakes.

It is to be observed that, when the pump is in operation, inward movement of the piston 16 in the cylinder 18 results in displacement of fluid and reduction of the effective volume in the cylinder 18. Because of the closure of the escape port through the piston during such inward movement thereof, the pressure of the fluid delivered by the pump to the cylinder is greatly enhanced, and this results in an increase of speed with which the friction elements of the brake are brought into frictional engagement with the drum. It is also to be observed that a large volume of fluid under pressure obviates the necessity of micrometric clearances between the frictional elements and the drum, so that dust, which is generally present, does not effect the brake lining and score the drum. It is further to be observed that when the pump is in operation an extremely rapid movement of the piston tending to apply the brakes will have much the same effect as is now produced by the operation of hydraulic brakes of the conventional type. However, the increase in intensity is much more rapid than in the conventional type of hydraulic brake.

When pressure is developed in the cylinder 18 in excess of the amount required to open the valve 78, the excess pressure acquired will be relieved by discharge of fluid through the port 54, the chamber 56, past the valve 78, and through the port 68 to the reservoir; hence with the brake pedal held in a given position, a fixed amount of pressure will be applied to the brakes regardless of the speed of the prime mover and of the pump operated thereby. Further inward movement of the piston results in increasing braking pressure in direct proportion to the amount of movement of the piston, the operator, of course, feeling the increase in pressure due to its effect on the piston, which is transmitted directly to the operator's foot through valve 108 and linkage connecting this valve to the operating shaft.

Upon release of the foot pedal lever, the operating shaft 4 rotates slightly and thereby moves the actuating lever 6 to release the applied force on the rod 114, and hence on the valve 108 and the piston 16. With the applied force removed, the piston is return to its retracted position by the spring 98, resulting in release of pressure in the cylinder 18.

As the piston returns to retracted position, fluid returns to the cylinder from the motor cylinder 24. Movement of the fluid from the motor cylinder 24 to the cylinder 18 is due to pressure on the pistons of the motor cylinder 24 imposed by the retractable spring 32 connecting the friction elements 26 and 28.

Due to friction on the column of fluid in the cylinder 18, the conduit 22, and to the tension of spring 98, the piston 16 returns to retracted position slightly in advance of the return of the fluid to the cylinder 18. This causes a partial vacuum in the cylinder 18, resulting in a collapse of the cup 96 and admission of fluid from the reservoir through the passage 94 to the cylinder.

Further pressure in the cylinder causes the cup 96 to return to static condition and moves the valve 108 from its seat against the resistance of the spring 120 to open the port 90 in the head of the piston so that excess fluid may be returned through the port 90 to the reservoir 2, it being understood that the spring 120 imposes an initial load of approximately six or eight pounds to the valve 108.

When the fluid has been completely displaced from the motor cylinder, the valve 108 is moved under the influence of the spring 120 to close the port 90 in the head of the piston, the cup 96 having previously returned to static condition, the apparatus is again in operative position. It is of course to be understood that the valve 108 is retained in open position when the pump is in operation.

When the prime mover is not in operation, the valves 42, 78 and 108 will be in closed position. Under these conditions, upon actuation of the brake the piston 16 is reciprocated in the cylinder 18 to displace the fluid in the cylinder through the pipe line 22 to the motor cylinder 24, to effectively spread the friction elements 26 and 28 into engagement with the drum 30. In this operation the valve 78 does not open because of the initial load imposed thereon by the spring 80 and because of the gradual increase of this load in proportion to the movement of the piston within the cylinder. Upon release of applied force on the piston, pressure in the cylinder is released and the piston is returned to its retracted position identically as hereinabove described.

The structure of the master cylinder piston and cooperating parts disclosed herein are claimed in my divisional application, Serial No. 737,170, filed July 27, 1934.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A fluid pressure brake system comprising a compression cylinder having a port, a continuously loaded valve controlling the port, means for supplying fluid under pressure to said cylinder, a piston reciprocable in the cylinder, and a member operatable to simultaneously advance the piston and to increase the load on the valve.

2. A fluid pressure system comprising a compression cylinder having a port, a loaded valve controlling the port, a pump for supplying fluid to said cylinder, a piston movable in the cylinder said piston having a port, a valve controlling the port in the piston, and a member operatable to simultaneously close one of the valves and increase the load on the other valve.

3. A fluid brake system comprising a cylinder having a port, a loaded valve controlling the port, means for supplying fluid under pressure to said cylinder, a piston reciprocable in the cylinder having a port, a valve controlling the port in the piston, and a member operatable to simultaneously actuate the valve controlling the port in the piston and to increase the load on the valve controlling the port in the cylinder.

4. A fluid pressure system comprising a reservoir, a cylinder having its open end communicating with the reservoir and a port in the cylinder also communicating with the reservoir, a loaded valve controlling the port, a reciprocable piston in the cylinder having a port providing a communication between the cylinder and the reservoir, a valve controlling the port and piston, a pump for supplying fluid under pressure to said cylinder, and a movable member for simultaneously actuating the valve to close the port in the piston and to increase the load on the valve controlling the port in the cylinder.

5. A fluid brake system comprising a reservoir, a cylinder having an open end communicating therewith and a port also communicating with the reservoir, a loaded valve controlling the port, a piston reciprocable in the cylinder having a port, a loaded valve controlling the port in the piston, a pump connected between the reservoir and the cylinder, and a member operatable to simultaneously move the piston and to increase the load on the valves.

6. A fluid pressure system comprising a reservoir, a cylinder having an open end communicating with the reservoir and a port also communicating with the reservoir, a spring loaded valve controlling the port, a piston reciprocable in the cylinder said piston having a port, a loaded valve controlling the port in the piston, a conduit connecting the reservoir to the cylinder, a pump connected in the conduit, a check valve for the conduit, and a manually operatable member for actuating the valve to close the port in the piston and to simultaneously compress the spring to increase the load on the valve controlling the port in the cylinder.

7. A fluid brake system comprising a reservoir, a cylinder having its open end communicating with the reservoir and a port also communicating with the reservoir, a loaded valve controlling the port, a piston reciprocable in the cylinder said piston having a port, a loaded valve controlling the port in the piston, a power driven pump having an intake connected to the reservoir, the outlet of the pump connected to the cylinder, a check valve connected between the pump and the cylinder, and a member operatable to simultaneously actuate the valve controlling the port in the piston and to increase the load on the valve controlling the port in the cylinder.

8. A fluid pressure system comprising a reservoir, a cylinder having an open end communicating therewith and a port also communicating with the reservoir, a loaded valve controlling the port, a piston movable in the cylinder having a port providing a communication between the cylinder and the reservoir, a valve controlling the port in the piston, a device for supplying fluid under pressure from the reservoir to the cylinder, and a member operatable to close the port in the piston and to advance the piston and to simultaneously increase the load on the valve controlling the port in the cylinder.

9. A fluid brake system comprising a reservoir, a cylinder supplied from the reservoir and provided with a port also communicating with the reservoir, a loaded valve controlling the port, a piston movable in the cylinder having a port providing communication between the reservoir and the cylinder, a loaded valve controlling the port in the piston, a movable member for closing the valve in the piston and advancing the piston through the valve and simultaneously increasing the load on the valve controlling the port in the cylinder.

10. A fluid pressure system comprising a reservoir, a cylinder having an open end communicating therewith and a port also communicating with the reservoir, a loaded valve controlling the port, a piston in the cylinder having a port providing a communication between the reservoir and the cylinder, a loaded valve for the port in the piston, a device for circulating fluid through the cylinder with sufficient pressure to retain the valve in the piston in open position, and an actuating member operatable to close the valve in the piston and move the piston and to simultaneously increase the load on the valve controlling the port in the cylinder.

GEORGE F. McDOUGALL.